United States Patent Office 3,222,300
Patented Dec. 7, 1965

3,222,300
POLYURETHANE PLASTICS FROM A POLYALKYLENE ETHER BEARING SOLELY TERMINAL HYDROXYL GROUPS
Günther Loew, Cologne, Germany, assignor, by direct and mesne assignments, of one-half to Farbenfabriken Bayer Aktiengesellschaft, Leverkusen, Germany, a German corporation, and one-half to Mobay Chemical Company, Pittsburgh, Pa., a corporation of Delaware
No Drawing. Filed Nov. 3, 1958, Ser. No. 771,222
Claims priority, application Germany, Nov. 9, 1957, F 24,364
5 Claims. (Cl. 260—2.5)

This invention relates to polyurethane plastics and, more particularly, to cellular polyurethane plastics which are obtained by reacting an organic polyisocyanate with modified polyalkylene ether glycols.

It has been known heretofore to use polyalkylene ether glycols in the manufacture of polyurethane plastics by the polyisocyanate polyaddition process. Preferably, polyalkylene ether glycols are in the first step reacted with an excess organic polyisocyanate to provide a compound having free NCO groups, and this compound is then foamed in a second step with the addition of water together with additives, such as, catalysts, and emulifiers which provide a uniform cell structure.

The heretofore known polyalkylene ether glycols, when modified with organic polyisocyanates and reacted with water, exhibit a slow curing rate. The slow curing rate is a disadvantage because carbon dioxide which is evolved from the reaction of isocyanate groups with water tends to escape with the resultant collapse of the cellular structure. Moreover, the heretofore known polyalkylene ether glycols modified with polyisocyanates are difficult to foam on existing mixing apparatuses.

It is an object of the present invention to provide novel polyurethane plastics having an improved elasticity. Another object of the invention is to provide an improved process for the production of polyurethane plastics. Still another object of the invention is to provide polyurethane plastics which rapidly cure, thus preventing the escape of carbon dioxide evolved from the reaction of an isocyanate group with water. A further object of the invention is to provide polyurethane plastics which may be manufactured on the currently available mixing apparatuses. Still another object is to provide novel polyhydroxyl compounds which are especially suitable for reaction with organic polyisocyanates in the manufacture of polyurethane plastics.

The above objects and others are accomplished, generally speaking, by providing a process for the manufacture of polyurethane plastics in which a polyalkylene ether glycol is first modified to provide at least two hydroxyl groups on at least one end of the molecule. The novel polyhydroxyl compounds having at least two hydroxyl groups on at least one end of the molecule are obtained in one preferred embodiment by reacting a polyalkylene ether glycol with epoxides or glycidyl ethers containing free hydroxyl groups. At least one mol of the epoxide or glycidyl ether is added for each mol of polyalkylene ether glycol.

Examples of epoxides with free hydroxyl groups which may be reacted at elevated temperatures of for instance 30–130° C. in the presence of suitable catalysts such as boron fluoride-etherate or perchloric acid with polyalkylene ether glycols to produce the polyhydroxyl compounds in accordance with the invention are, for example, 1,2-oxide of glyceride, the mono-epoxide of pentaerythritol, and the oxide of trimethanol propane having the formula

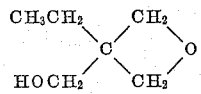

Any suitable glycidyl ethers having free hydroxyl groups may be reacted with polyalkylene ether glycols to obtain the polyhydroxyl compounds of the present invention. Suitable glycidyl ethers may be obtained by condensing a polyhydric alcohol, such as, for example, ethylene glycol, diethylene glycol, glycerine, 1,2,6-hexanetriol, or trimethanol propane, with epichlorohydrin in a molar ratio so that not all of the hydroxyl groups of the polyhydric alcohol are etherified and the product contains free hydroxyl groups. This reaction product is then treated with an alkali, such as, a solution of sodium hydroxide, so that they are transformed into the associated epoxides which contain free hydroxyl groups.

Another procedure for obtaining the novel polyhydroxyl compounds of the present invention comprises reacting at least one mol of epichlorohydrin to one mol of a polyalkylene ether glycol at elevated temperatures of for instance 30–130° C. in the presence of suitable alkaline or acid catalysts such as perchloric acid sodium hydroxide or boron complexes. The resultant product has a molecular chain containing at one end position a hydroxyl group and a chlorine atom. The chlorine atom is replaced by another hydroxyl group by boiling with an alkali, such as, sodium hydroxide.

Indeed, any compound having the grouping

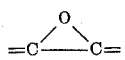

may be condensed with the condensation product of an alkylene oxide as hereinafter defined to provide the novel polyhydroxyl compound in accordance with the present invention, insolong as the compound having the epi grouping

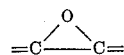

contains free hydroxyl groups or contains a halogen atom, such as, for example, a chlorine atom which may be later removed by treatment with a alkali, such as, sodium hydroxide.

Any suitable polyalkylene ether glycol may be used in accordance with the present invention. Polyalkylene ether glycols may be prepared by condensing any suitable alkylene oxide having from 2 to 5 carbon atoms, such as, for example, ethylene oxide, propylene oxide, butylene oxide, amylene oxide, or mixtures thereof. Furthermore, the condensation product may be used in admixture with other suitable compounds for example, 1,4-butylene glycol, glycerine, trimethanol propane, pentaerythritol, and the like. It is to be understood that the term "condensation product" is meant to include the tetramethylene ether glycol prepared by polymerization of tetrahydrofuran. The condensation product preferably should have a molecular weight of at least about 500 and an hydroxyl number of not more than about 225.

The substantially linear polyhydroxyl compounds provided by the present invention may be reacted with an organic polyisocyanate and water to provide improved cellular polyurethanes. The characteristic molecular structure of the polyhydroxyl compounds of the invention in which at least two hydroxyl groups are provided on at least one end of the molecular chain are particularly suitable for the production of cellular polyurethanes. It is preferred that the polyhydroxyl compound provided by the invention have a molecular weight of from about 600 to about 6,000.

Any suitable organic polyisocyanate may be used in accordance with the invention. Examples of suitable organic polyisocyanates are ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, tolylene-2,4-diisocyanate, tolylene-2,6-diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, triphenyl methane triisocyanate, and 1,5-naphthalene diisocyanate.

It is preferred to use suitable catalysts when carrying out the foaming in the presence of water. Examples of suitable catalysts are tertiary amines, such as, for example, dimethyl hexahydroaniline, N-methyl morpholine, the reaction product of N,N'-diethylaminoethanol with phenyl isocyanate, bis-diethylaminoethanol adipate, and organic metal compounds. Emulsifiers, for example, sulphurisation products of hydrocarbons or sulphonated castor oil, and also fillers, dyes, and the like, can be employed in addition. An addition of silicone oil has proved particularly desirable to produce cellular polyurethane products of uniform cell size. Any suitable liquid organo polysiloxane may be used as a silicone oil provided the viscosity thereof is from about 10 to about 500 centistokes at 20° C. Examples of suitable silicone oils include dimethyl siloxane polymers having a viscosity of 50 centistokes and dimethyl siloxane polymers having a viscosity of 440 centistokes at 20° C. and mixtures thereof.

The polyhydroxy compounds to be used according to the invention are reacted with the polyisocyanate in such quantities that free isocyanate groups result, in other words, an excess of polyisocyanates is employed. The foaming by addition of water and, if desired, other auxiliary substances, preferably takes place after the reaction between the polyhydroxy compounds and the polyisocyanates. It can take place intermittently, but, in particular, it can be carried out on a continuously-operating mixing apparatus, such as is described in, for example, United States Patent Number 2,764,565.

By variation of the NCO content of the branched isocyanate-modified polyhydroxy compound and by modifying the quantity of added water, it is possible to control the amount of carbon dioxide which is developed and, with the co-operation of added activators, the specific gravity of the resulting foam material can be varied within wide limits.

The cellular polyurethanes obtained in accordance with the invention are distinguished from the known cellular polyurethanes by their high elasticity and smaller permanent deformation, by being easier to work, and by their higher stability and more rapid curing. One particular technical advance, however, is to be seen in the fact that the production of the foam material can be carried out in the known continuously-operating mixing apparatus, which hitherto was possible only by the use of complicated auxiliary measures when using strictly linear polyethers as starting materials. In this way, not only is the production of such foams on a large technical scale facilitated, but their satisfactory reproducibility is also, for the first time, assured by the possibility of mechanical processing.

In order to better describe and further classify the invention, the following are specific embodiments.

*Example 1*

About 100 parts by weight of an adduct prepared by condensing about 1 mol of linear polypropylene glycol (molecular weight 2000) and 2 mols of glycerine-1,2-oxide in the presence of 0.1% boron trifluoride etherate at about 100° C., are heated together with about 24.3 parts by weight of tolylene diisocyanate for 2 hours at about 100° C. After cooling to room temperature, about 15.7 parts by weight of additional tolylene diisocyanate are added.

The result is an isocyanate-modified polyhydroxy compound with an NCO content of about 8.2%, which is foamed by adding a mixture of about 2 parts by weight of dimethyl benzylamine, 1 part by weight of paraffin oil, and 1.8 parts by weight of water for each 100 parts by weight of the isocyanate-modified polyhydroxy compound. The result is an elastic foam material having good mechanical properties.

*Example 2*

About 100 parts by weight of an adduct prepared by reacting 1 mol of linear polypropylene glycol (molecular weight 2000) with about 2 mols of epichlorhydrin in the presence of 0.1% of perchloric acid at about 115° C. and subsequently saponifying the $CH_2Cl$ groups of the reaction product to $CH_2OH$ groups, are heated to 120° C. for about 3 hours with 23.8 parts by weight of tolylene diisocyanate. After cooling to room temperature, another 16.2 parts by weight of tolylene diisocyanate are added. The result is an isocyanate-modified polyhydroxy compound with an NCO content of about 8.3%.

For foaming purposes, there are added to 100 parts by weight of this isocyanate-modified polyhydroxy compound, about 2 parts by weight of pentamethyl diethylene triamine, 1 part by weight of silicone oil, and 1.8 parts by weight of water. The result is a soft elastic foam material.

It is to be understood that any of the aforementioned compounds having at least two hydroxyl groups on at least one end of the molecule may be substituted in the above examples and that any of the hereinbefore listed organic polyisocyanates may be substituted in the foregoing examples. Likewise, any of the aforementioned additives may also be substituted in the foregoing examples.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. In the preparation of a cellular polyurethane plastic by a process which comprises reacting an excess of an organic polyisocyanate with a polyhydroxy compound in a first step to prepare a prepolymer having free —NCO groups and subsequently reacting said prepolymer with water to produce a cellular polyurethane plastic, the improvement which comprises reacting an excess of said organic polyisocyanate with a polyhydroxyl compound having at least two hydroxyl groups on at least one end of the molecule, said polyhydroxyl compound having a molular weight of at least about 500, an hydroxyl number below about 225 and having been obtained by reacting a polyalkylene ether glycol, the alkylene radicals of which contain from 2 to 5 carbon atoms, at temperatures between about 30° C. and 130° C. in the presence of a member selected from the group consisting of alkaline catalysts and acid catalysts with at least one mol of a monomeric epoxide compound containing epoxide groups per mol of said polyalkylene ether glycol and containing a member selected from the group consisting of free hydroxyl groups and halogen atoms said halogen atoms being reactive with sodium hydroxide to yield free hydroxyl groups, provided that said halogen atoms are replaced with hydroxyl groups prior to reaction with said organic polyisocyanate, said monomeric epoxide being free from other groups reactive with —NCO groups, to prepare a prepolymer having free —NCO groups and reacting said prepolymer with water to yield a cellular polyurethane plastic.

2. The product of the process of claim 1.
3. The process of claim 1 wherein said organic polyisocyanate is a tolylene diisocyanate.
4. The process of claim 1 wherein said monomeric compound containing epoxide groups is glycerine-1,2-oxide.
5. The process of claim 1 wherein said polyhydroxyl compound containing at least two hydroxyl groups on at least one end of the molecule has a molecular weight of about 600 to about 6000.

References Cited by the Examiner

UNITED STATES PATENTS

| | | | |
|---|---|---|---|
| 2,520,733 | 8/1950 | Morris et al. | 260—615 |
| 2,731,444 | 1/1953 | Greenlee | 260—18 |
| 2,674,619 | 4/1954 | Lundsted | 260—615 |
| 2,677,700 | 5/1954 | Jackson | 260—615 |
| 2,788,335 | 4/1957 | Barthel | 260—77.5 |
| 2,809,177 | 10/1957 | Shokal | 260—77 |
| 2,828,345 | 3/1958 | Spriggs | 260—615 |
| 2,830,038 | 4/1958 | Pattison | 260—77.5 |
| 2,843,569 | 7/1958 | Benning | 260—77.5 |
| 2,948,691 | 8/1960 | Windemuth | 260—2.5 |
| 3,036,021 | 8/1962 | Trescher | 260—2.5 |

OTHER REFERENCES

Lang: "Handbook of Chemistry," 9th Edition, Handbook Pub., Sandusky, Ohio.

LEON J. BERCOVITZ, *Primary Examiner.*

MILTON STERMAN, H. N. BURSTEIN, *Examiners.*